US012762941B2

(12) United States Patent
Eaton

(10) Patent No.: US 12,762,941 B2
(45) **Date of Patent: *Oct. 13, 2026**

(54) METHODS AND SYSTEMS FOR OUTPUTTING ALERTS ON USER INTERFACES

(71) Applicant: DISH Network L.L.C., Englewood, CO (US)

(72) Inventor: Zane Eaton, Pompano Beach, FL (US)

(73) Assignee: DISH Network L.L.C., Englewood, CO (US)

(*) Notice: Subject to any disclaimer, the term of this patent is extended or adjusted under 35 U.S.C. 154(b) by 26 days.

This patent is subject to a terminal disclaimer.

(21) Appl. No.: 18/922,101

(22) Filed: Oct. 21, 2024

(65) Prior Publication Data

US 2025/0046177 A1 Feb. 6, 2025

Related U.S. Application Data

(63) Continuation of application No. 18/306,903, filed on Apr. 25, 2023, now Pat. No. 12,142,130, which is a continuation of application No. 17/526,842, filed on Nov. 15, 2021, now Pat. No. 11,657,699.

(51) Int. Cl.

| | |
|---|---|
| ***G08B 25/00*** | (2006.01) |
| ***G08B 25/01*** | (2006.01) |
| ***G08B 25/08*** | (2006.01) |
| ***G08B 27/00*** | (2006.01) |

(52) U.S. Cl.

CPC ......... *G08B 25/009* (2013.01); *G08B 25/016* (2013.01); *G08B 25/08* (2013.01); *G08B 27/00* (2013.01)

(58) Field of Classification Search

CPC .... G08B 25/009; G08B 25/016; G08B 25/08; G08B 27/00

See application file for complete search history.

(56) References Cited

U.S. PATENT DOCUMENTS

| | | | | |
|---|---|---|---|---|
| 11,657,699 | B1 | 5/2023 | Eaton | |
| 2012/0072844 | A1* | 3/2012 | Lefrancois des Courtis | G06Q 30/02 709/204 |
| 2014/0280578 | A1* | 9/2014 | Barat | H04W 4/12 709/204 |
| 2016/0366085 | A1* | 12/2016 | Touloumtzis | H04L 67/54 |
| 2018/0373399 | A1 | 12/2018 | Battula et al. | |
| 2019/0122528 | A1 | 4/2019 | Yang et al. | |
| 2020/0100084 | A1* | 3/2020 | Martin | H04W 4/90 |
| 2023/0260389 | A1 | 8/2023 | Eaton | |

* cited by examiner

*Primary Examiner* — Omeed Alizada

(74) *Attorney, Agent, or Firm* — Kilpatrick Townsend & Stockton LLP

(57) ABSTRACT

A technique is directed to methods and systems for outputting alerts on user interfaces. In some implementations, an alert system can identify devices connected to the alert interface and determine the user interface capabilities (e.g., audio, visual, or vibration) of each device. Upon receiving an alert of an emergency event, the alert system can determine the location of the user within a structure and select a device(s) nearby the user to transmit or display the notification of the emergency event to the user. The selected device can identify the emergency event and output the alert based upon the visual audible, or vibration user interface capabilities of the selected device.

20 Claims, 7 Drawing Sheets

METHODS AND SYSTEMS FOR OUTPUTTING ALERTS ON USER INTERFACES

CROSS-REFERENCE TO RELATED APPLICATIONS

This application is a continuation of U.S. patent application Ser. No. 18/306,903 filed Apr. 25, 2023 which is a continuation of U.S. patent application Ser. No. 17/526,842 filed Nov. 15, 2021, the disclosures of which are incorporated herein by reference in their entirety.

BACKGROUND

A user can receive a notification of an emergency, such as a tornado or tsunami, on their smart phone. However, if the user does not have their smart phone on their person, the user may not receive the notification with enough time to respond to the emergency in a safe manner. During emergency events, the earlier a user is alerted can increase the safety of the user.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Aspects of the present disclosure are directed to methods and systems for outputting alerts on user devices. When an emergency event occurs, users (e.g., homeowner, parent, first responder, etc.) would like to receive information about the event as quickly as possible. The events can include weather events, home security alerts, emergency phone calls, amber alerts, fire/carbon monoxide detection events, or other similar type events. In some cases, the user does not have access to the device receiving the emergency alert. For example, the user is in a location and does not have access to their typical warning device, such as the user is in the basement of a house and their smart phone is in another room. Thus, there is a need for an alert system which connects to any user device for messaging during emergency events.

The disclosed method utilizes techniques for outputting an alert from connected devices in a structure (e.g., home, office, building, event center, etc.). A "connected device" may refer to devices connected to a central network.

Examples of the devices are a refrigerator with an integrated display, a thermostat with display, a network-connected video camera with sound, smart phones, tablets, or any device with a speaker or display which can output an audio, visual, or vibration alert. The alert system has a connected device alert interface (e.g., gateway, API, router, network, etc.) that allows interactive messaging between the connected devices for displaying or transmitting alerts. For example, the device that first receives the warning of the event sends out a global message to the other connected devices.

The alert system can identify devices connected to the alert interface and determine the user interface capabilities (e.g., audio, visual, or vibration) of each device. Upon receiving an alert of an emergency event, the alert system can determine the location of the user within a structure and select a device(s) nearby the user to transmit or display the notification of the emergency event to the user. The selected device can identify the emergency event and output the alert based upon the visual and audible user interface capabilities of the selected device.

Figure 1:
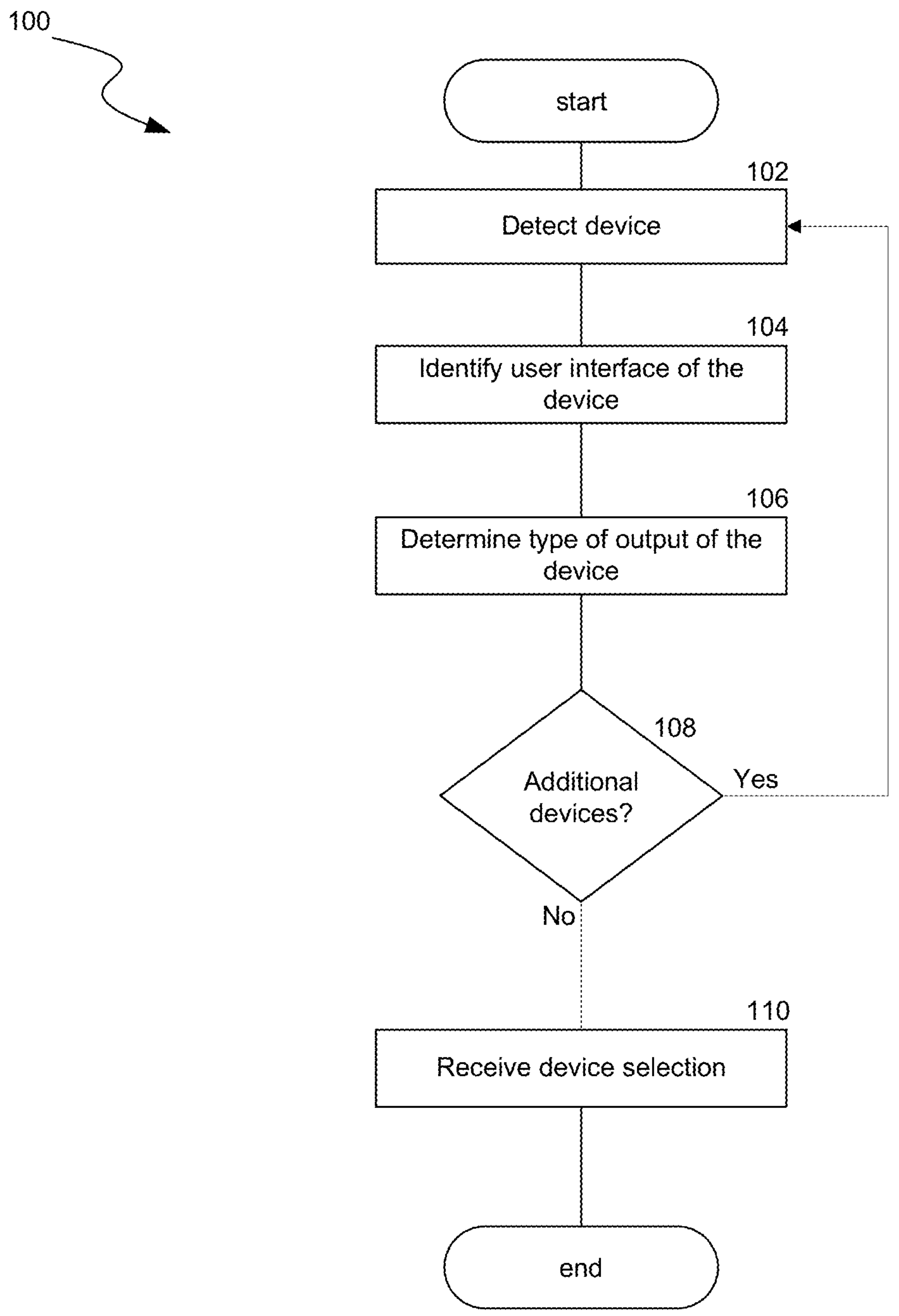
FIG. 1 is a flow diagram illustrating a process used in some implementations for identifying devices for outputting alerts.

Several implementations are discussed below in more detail in reference to the figures. FIG. 1 is a flow diagram illustrating a process 100 used in some implementations for identifying devices for outputting alerts. In an embodiment, process 100 is triggered by a device connecting to an alert interface, a device powering on, receiving an alert of an event, or a user inputting a command.

At step 102, process 100 detects a device connected to the alert interface (e.g., API, router, building network, private network, application on devices, etc.). The devices can include any device that can output a visual, audio, or vibration notification, such as handheld or laptop devices, kitchen/home appliances (e.g., refrigerator, stove, oven, alarm clock, thermostat, etc.), wearable electronics, gaming consoles, tablet devices, speakers, lights, motion sensors, or cameras. A device can connect to the alert interface by downloading an application or connecting to the alert network.

Process 100 can identify a list of devices connected to the alert interface and send a query message to each connected device. If the device recognizes the query message, the device can reply with a message that indicates that the device is ready to receive alerts. The reply can contain the display type and notification capabilities of the device. In some implementations, the devices do not need to identify themselves. Any device that is capable of outputting a warning (e.g., a network-connected smoke alarm, etc.) can broadcast the alarm to one or more devices on the network (e.g., based on router settings). The emergency broadcast can be sent to a port address of the receiving device(s). A network-connected device that detects an emergency message can have the capability of identifying the emergency message, decoding it, and displaying an alert on the device interface. Some or all devices connected to the alert interface can take independent action based on the information of the alert. For example, a home weather station, connected to the alert interface, detects that a tornado warning has been issued and broadcasts the tornado warning on the network. The set top box (STB) can receive the broadcast and display a warning notification on the TV monitor. A network-connected refrigerator can receive the broadcast and display a notification on the refrigerator display screen or emit an audible alert. A connected phone can receive the broadcast and display a notification as an SMS message. A connected fire alarm can receive the broadcast and determine to do nothing because the warning is not fire related.

At step 104, process 100 identifies the user interface capabilities of the device. Process 100 can identify the user interface capabilities based on whether the device has a display to output a visual message, a speaker to output an audible notification, lights to output a visual notification (e.g., flashing light), or a vibration capability. Process 100 can query the devices to determine the output capabilities of the devices. In some implementations, process 100 retrieves the user interface data of the device from manufacturer websites and identify the make and model, dimensions, and capabilities of the device. In an example, process 100 identifies the size of a display and how many characters the display can output. In another example, process 100 identifies the speaker capability of the device and whether the speaker can output an audible message or a tone pattern. In another example, process 100 identifies the lights on a device, the flashing patterns, and the light colors. In another example, process 100 identifies the vibration capability of the device and the vibration patterns the device can output. Process 100 can receive the user interface capabilities of each device from a user. For example, when a user connects a device to the alert interface, the user provides the output capabilities of the device.

At step 106, process 100 determines the type of alert to output based on the user interface of the device. Process 100 determines how to output an alert from the device based on the visual, audio, or vibration capabilities of the device. In an example, for a device with a display, process 100 outputs a message with details about the alert based on the size and number of characters on the display. In another example, for a device with a speaker, process 100 outputs an audible alert, such as an audio message or alarm sound, to notify the user of the event. In another example, for a device with vibration capabilities, process 100 outputs a vibration alert to notify the user of the event.

At step 108, process 100 determines if there are any additional devices connected to the alert interface. If additional devices are connected to the alert interface, process 100 returns to step 102. If additional devices are not connected to the alert interface, process 100 continues to step 110.

At step 110, process 100 receives a device selection from the user to output alerts. A user can select to enable or disable devices from outputting alerts in a structure that are connected to the alert interface. For example, a user can select to have only one device in each room of a home output alerts, select to have specific devices output alerts, or select every connected device to output the alerts. The user can select for emergency events to be received at the alert interface or by a primary device (e.g., smart phone or tablet) and then transferred to other connected devices. Process 100 can select specific devices to output alerts, coordinate between devices for output of alerts, and using a managing device(s) to coordinate output or suppress output of alerts for other devices connected within a structure. In an example, process 100 determines that a fire alarm does not make an audible alarm for a weather alert because the system does not want the user to be confused and think that audible fire alarm is indicating a fire. In another example, if there are connected telephones, the system may not to send certain warnings to phones that are dedicated to children, or in an alternative embodiment, the system may send a child-specific or age-appropriate warning.

Figure 2:
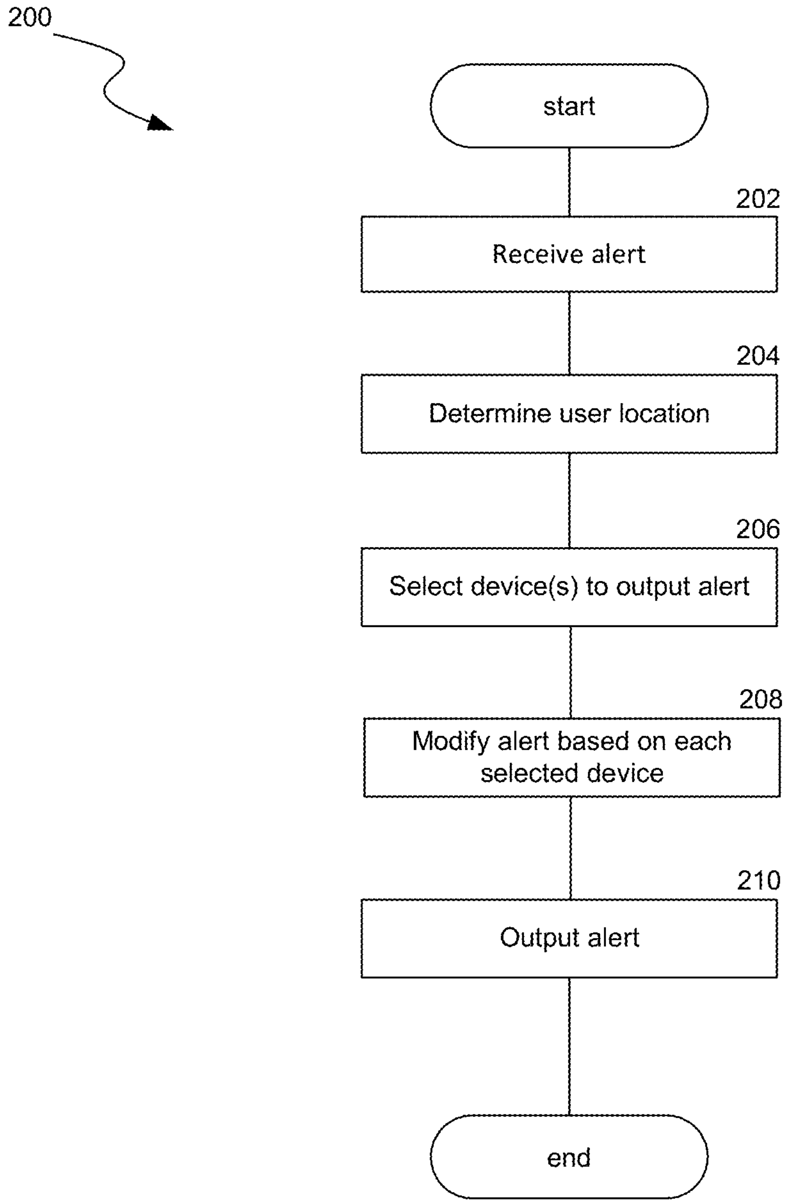
FIG. 2 is a flow diagram illustrating a process used in some implementations for outputting alerts on user interfaces.

FIG. 2 is a flow diagram illustrating a process 200 used in some implementations for outputting alerts on user interfaces. In an embodiment, process 200 is triggered by a device connecting to an alert interface, a device powering on, receiving an alert of an event, or a user inputting a command. At step 202, process 200 receives an alert of an event. Process 200 can receive the alert at the alert interface, or on a primary device, such as the user's smart phone or tablet, or any device connected to the alert system. The alert can be sent directly to device, such as a phone call or message (e.g., email, SMS, notification, etc.). Process 200 can retrieve the alert with data scraping (e.g., web scraping, web harvesting, or web data extraction) from databases or websites. For example, process 200 monitors a weather website to identify weather events within a proximity of the user's or structure's location.

At step 204, process 200 determines the location of the user within the structure (e.g., building, house, apartment, condo, etc.). Process 200 can determine the location of the user with motion detection sensors to identify where in the structure the user is currently located. In some implementations, process 200 uses a location of a user wearable device, biometric sensors (e.g., facial recognition, body recognition, etc.), cameras (e.g., infrared, heat detection, etc.), or microphones to identify the current location of the user.

In an example, process 200 locates the user in the basement because the basement STB is in use and interacting with the user. When a network-connected fire alarm issues an audible alert on the third floor of the house, the user may not hear the alert as it is out of the range of hearing of the user. Process 200 can display the audible alert (or a visual alert) from the STB devices to ensure the user is notified. In some cases, process 200 can elevate the volume of the audible alert when the user is detected in another room or above a threshold distance from the device projecting the audible alert. In another example, process 200 determines that the user is in the room (e.g., basement) in a building and unable to see the weather outside. Process 200 can elevate the alerts because the user is unaware of weather events (e.g., snow, rain, wind, etc.) due to the user's current location. In another example, process 200 locates the user, though the use of sensors or interaction with connected devices, on the second floor of a building. When a connected basement sump pump issues a warning that it has failed, process 200 can generate an audible warning on the sump pump (or on devices throughout the building), because the user is located far from the basement sump pump. Process 200 can elevate the volume of the alert, or add more devices to project the alert, so that potential basement flooding is averted.

Figure 3:
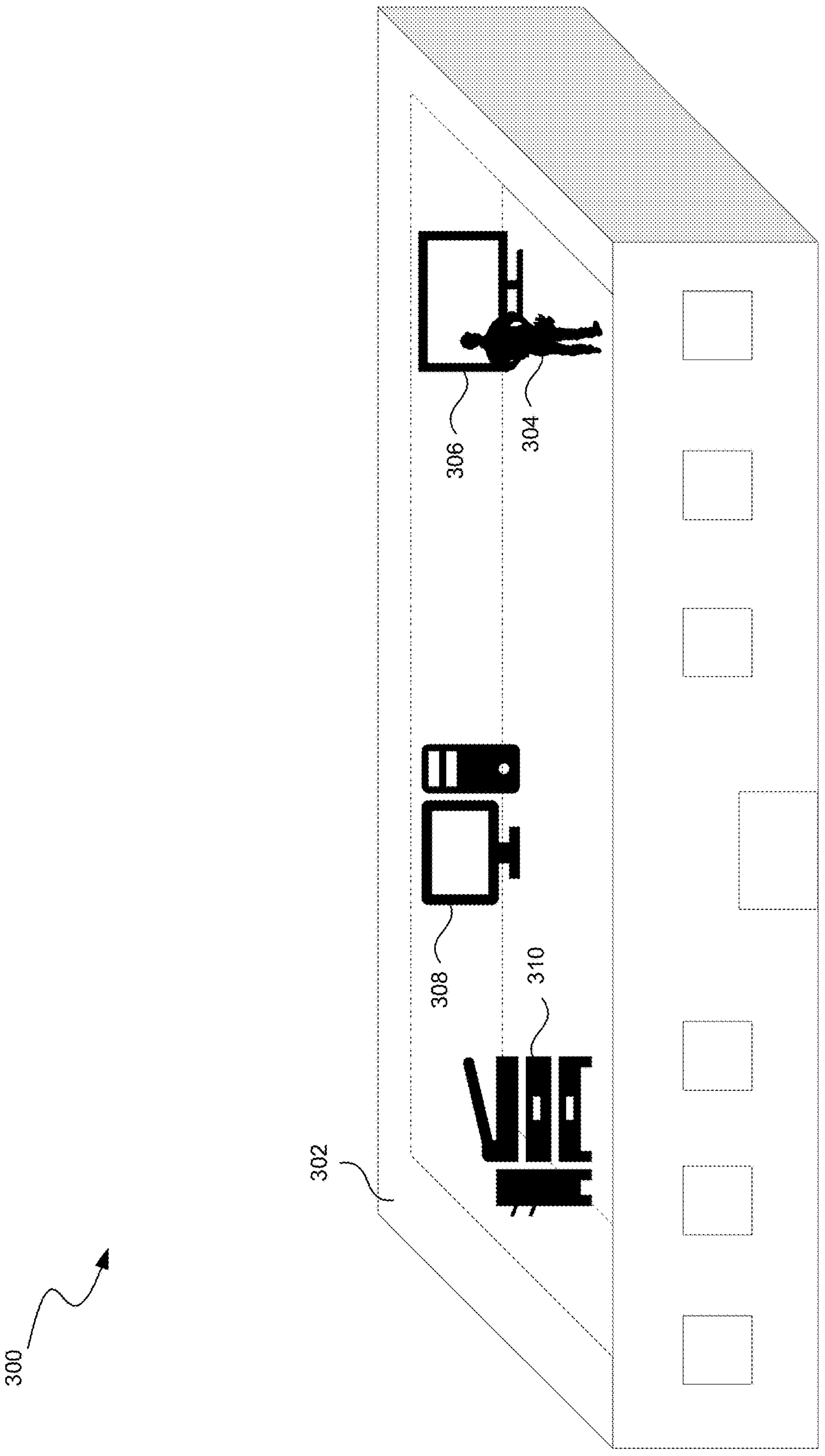
FIG. 3 is an illustration of a building with user devices.

At step 206, process 200 selects a device(s) at the location of the user to output the alert to the user. For example, process 200 selects a device in the same room of the structure as the user. Process 200 can select devices within a threshold distance of the user's location. In some implementations, process 200 selects a single device of a group of devices to output the alert, when the group of devices are within a threshold distance of each other. For example, when a refrigerator display, a thermostat display, and tablet are in the same room and within a threshold distance (e.g., any distance such as, 2 feet, 4 feet, etc.), process 200 selects the tablet to output the alert. Example 300 of FIG. 3 illustrates devices 306, 308, and 310 within structure 302. In example 300, process 200 selects device 306 to output the alert to user 304 based device 306 being within a proximity of user 304. In some implementations, process 200 selects the device to output the alert to the user based on the subject matter of the event. In an example, for weather events, process 200 selects devices with displays, such as tablets, computer monitors, or TV monitors. In another example, for phone calls from preselected numbers (e.g., numbers of relatives, work calls, etc.) process 200 selects devices with speakers to output the alert of an urgent phone call.

At step 208, process 200 modifies the alert based on output capability of the selected device. Process 200 can customize the alert based on the user interface of the device. For example, process 200 adjusts the length of the alert message depending on the size or number of characters of the display screen of the device, such as "hurricane 5 miles" for a small screen or "hurricane Ida is 5 miles from your location." Process 200 can select to output only audio alerts if the device does not have a screen, or only visual alerts if the device does not have a speaker. In some implementations, process 200 modifies the alert based on the subject matter of the alert. For example, a weather event has a different alert (e.g., tone pattern, vibration pattern, flashing or light pattern, etc.) than a family emergency event. In some implementations, the alerting history for a user, or user location, can alter the nature of alerting in the future. For example, if a user responds to a first type of alert (e.g., weather events, phone calls from family members, etc.) but ignores a second type of alert (e.g., alerts regarding broken appliances, non-family member phone calls, etc.), process 200 can determine to notify the user for the first type of alerts but not notify the user for the second type of alert. In first example, for a tornado watch and a tornado warning, if a device only has a red LED and a horn, both the LED and horn are used when the device receives a tornado warning or watch. In a second example, for a tornado watch and a tornado warning, if the device has a multicolor LED and a horn, the horn and yellow LED color are used when the alert is a tornado watch, while the horn and red LED are used when alert is a tornado warning. In a third example, for a tornado watch and tornado warning, the user's smart phone can receive a tornado warning message in red capital letters with a repeating audible indicator, while for a tornado watch message, the user's smart phone can receive the alert in yellow/orange lettering and a single audible indicator.

Figure 4:
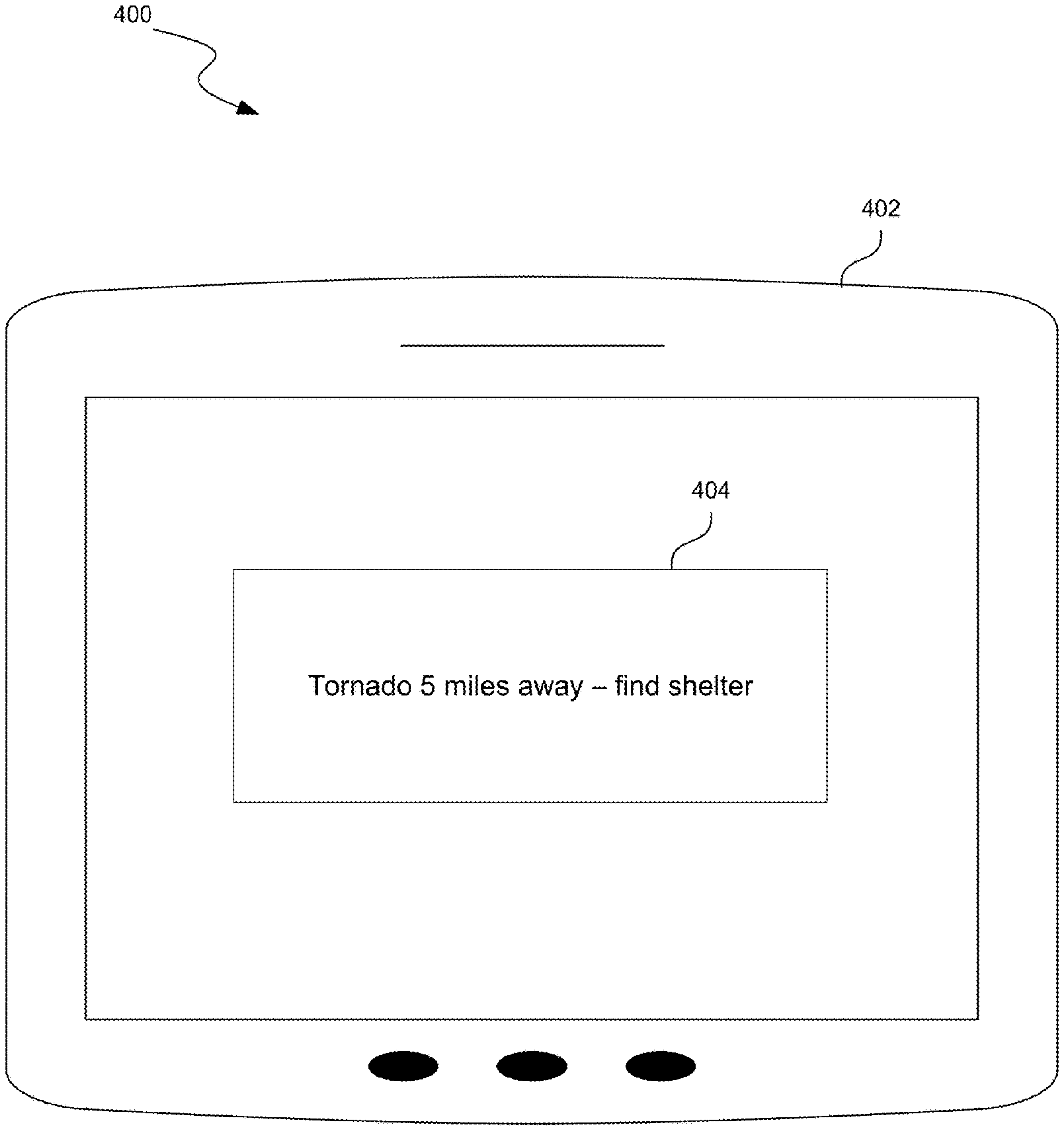
FIG. 4 is an illustration of an alert on a user interface.

At step 210, process 200 outputs the alert from the selected device(s). The alert can continue until the user acknowledges the alert, such as a button command or a voice command. In some cases, the alert continues for a predetermined amount of time and shuts off. Example 400 of FIG. 4 illustrates device 402 outputting an alert message 404. In some implementations, process 200 outputs the alert on all the devices connected to the alert interface. For example, if the alert is urgent (e.g., injured relative, tsunami/tornado/hurricane within a threshold distance of the user's location, or message from a selected phone number, such as a phone number of a child or grandparent) process 200 outputs the alert on every connected device to notify the user as soon as possible and indicate the urgency of the alert. If a device has various user interface capabilities, such as visual, audible, and vibration, process 200 can output the alert on the device using all the capabilities or a selected set of capabilities, such as visual and vibration.

Figure 5:
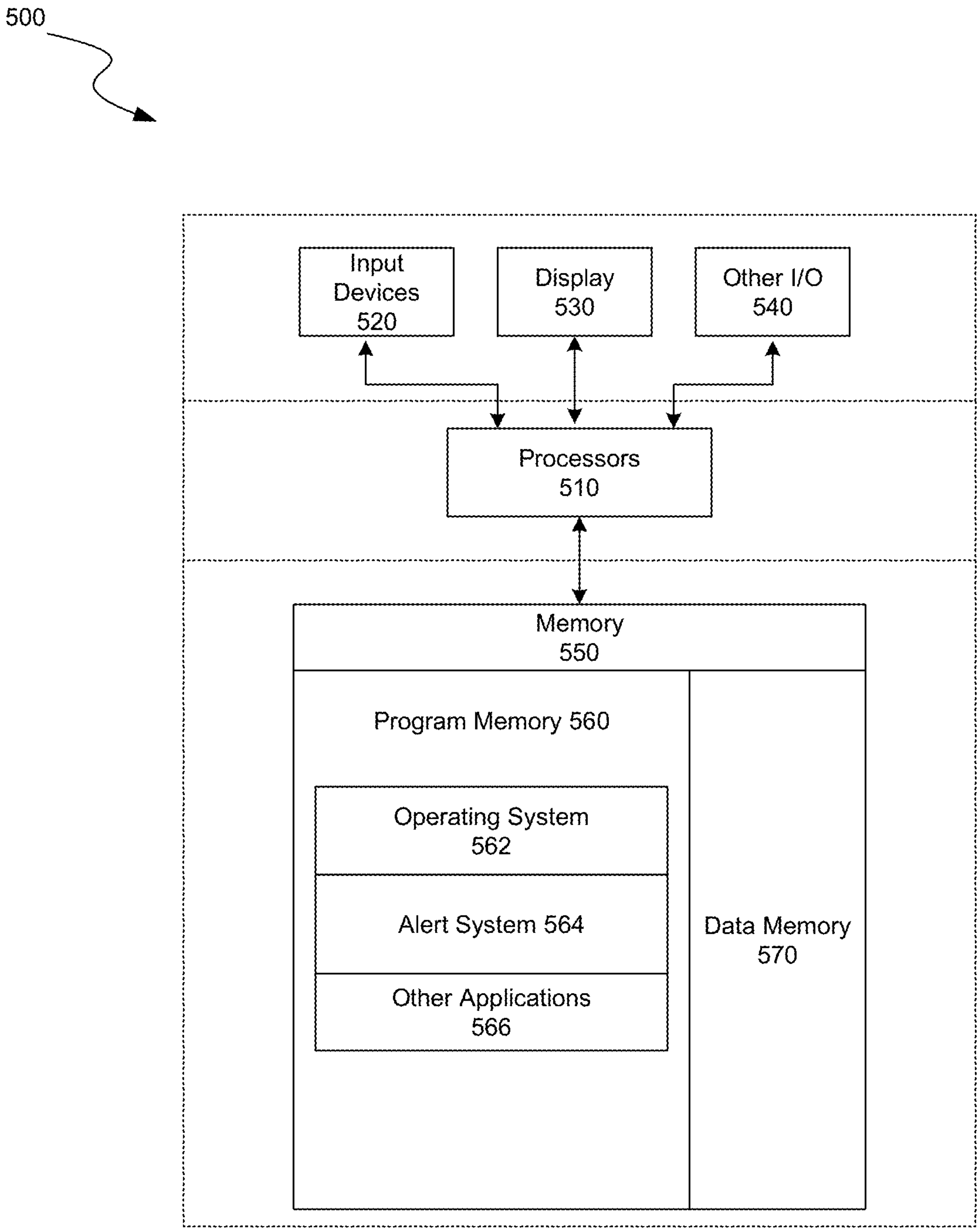
FIG. 5 is a block diagram illustrating an overview of devices on which some implementations can operate.

FIG. 5 is a block diagram illustrating an overview of devices on which some implementations of the disclosed technology can operate. The devices can comprise hardware components of a device 500 that manage entitlements within a real-time telemetry system. Device 500 can include one or more input devices 520 that provide input to the processor(s) 510 (e.g. CPU(s), GPU(s), HPU(s), etc.), notifying it of actions. The actions can be mediated by a hardware controller that interprets the signals received from the input device and communicates the information to the processors 510 using a communication protocol. Input devices 520 include, for example, a mouse, a keyboard, a touchscreen, an infrared sensor, a touchpad, a wearable input device, a camera- or image-based input device, a microphone, or other user input devices.

Processors 510 can be a single processing unit or multiple processing units in a device or distributed across multiple devices. Processors 510 can be coupled to other hardware devices, for example, with the use of a bus, such as a PCI bus or SCSI bus. The processors 510 can communicate with a hardware controller for devices, such as for a display 530. Display 530 can be used to display text and graphics. In some implementations, display 530 provides graphical and textual visual feedback to a user. In some implementations, display 530 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 540 can also be coupled to the processor, such as a network card, video card, audio card, USB, firewire or other external device, camera, printer, speakers, CD-ROM drive, DVD drive, disk drive, or Blu-Ray device.

In some implementations, the device 500 also includes a communication device capable of communicating wirelessly or wire-based with a network node. The communication device can communicate with another device or a server through a network using, for example, TCP/IP protocols. Device 500 can utilize the communication device to distribute operations across multiple network devices.

The processors 510 can have access to a memory 550 in a device or distributed across multiple devices. A memory includes one or more of various hardware devices for volatile and non-volatile storage, and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 550 can include program memory 560 that stores programs and software, such as an operating system 562, alert system 564, and other application programs 566. Memory 550 can also include data memory 570, user interface data, event data, image data, biometric data, sensor data, device data, location data, network learning data, application data, alert data, structure data, camera data, retrieval data, management data, notification data, configuration data, settings, user options or preferences, etc., which can be provided to the program memory 560 or any element of the device 500.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 6:
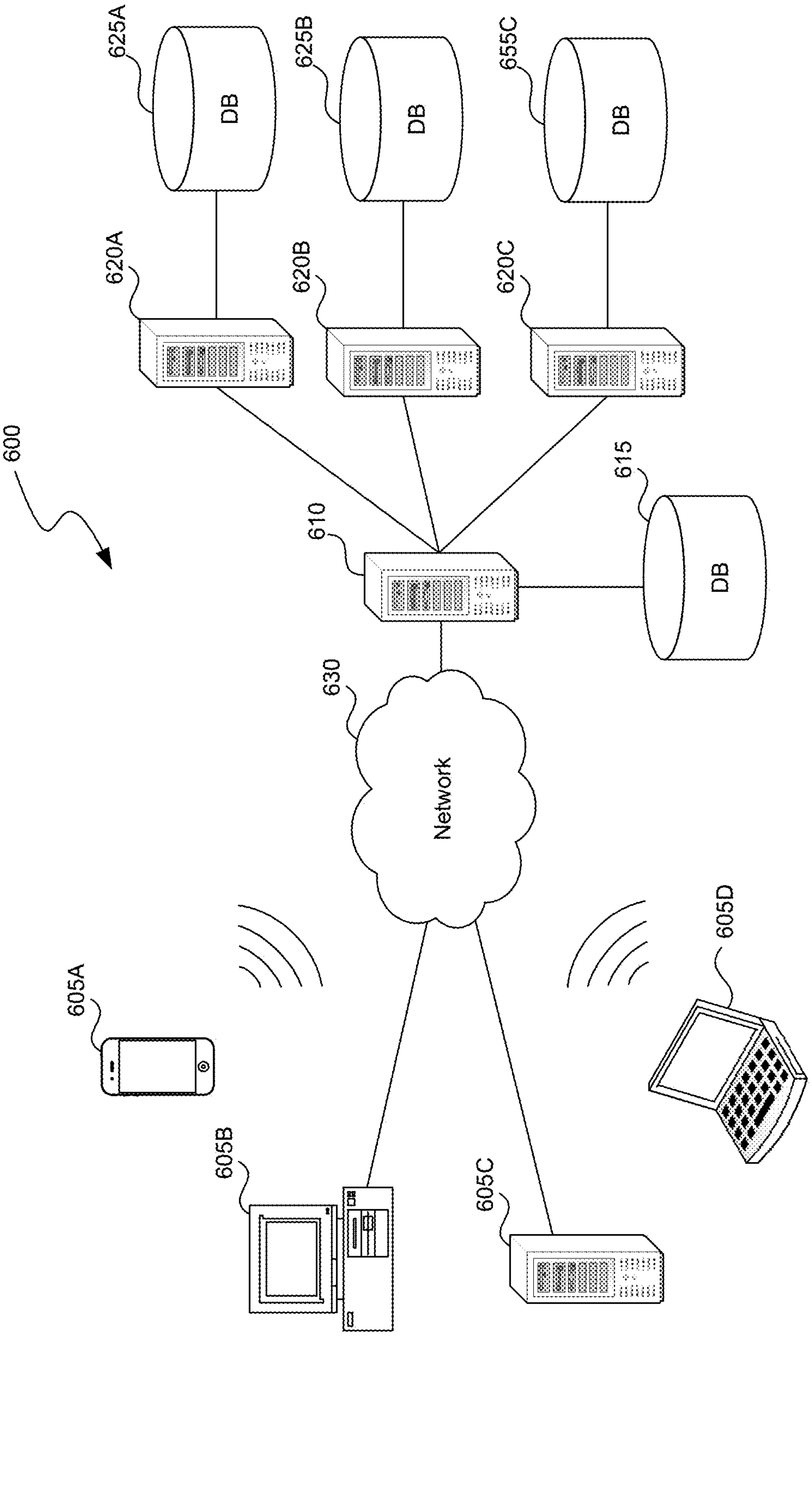
FIG. 6 is a block diagram illustrating an overview of an environment in which some implementations can operate.

FIG. 6 is a block diagram illustrating an overview of an environment 600 in which some implementations of the disclosed technology can operate. Environment 600 can include one or more client computing devices 605A-D, examples of which can include device 500. Client computing devices 605 can operate in a networked environment using logical connections through network 630 to one or more remote computers, such as a server computing device 610.

In some implementations, server 610 can be an edge server which receives client requests and coordinates fulfillment of those requests through other servers, such as servers 620A-C. Server computing devices 610 and 620 can comprise computing systems, such as device 500. Though each server computing device 610 and 620 is displayed logically as a single server, server computing devices can each be a distributed computing environment encompassing multiple computing devices located at the same or at geographically disparate physical locations. In some implementations, each server 620 corresponds to a group of servers.

Client computing devices 605 and server computing devices 610 and 620 can each act as a server or client to other server/client devices. Server 610 can connect to a database 615. Servers 620A-C can each connect to a corresponding database 625A-C. As discussed above, each server 620 can correspond to a group of servers, and each of these servers can share a database or can have their own database. Databases 615 and 625 can warehouse (e.g. store) information such as implement data, user interface data, event data, image data, detection data, biometric data, sensor data, device data, location data, network learning data, application data, alert data, structure data, camera data, retrieval data, management data, notification data, configuration data. Though databases 615 and 625 are displayed logically as single units, databases 615 and 625 can each be a distributed computing environment encompassing multiple computing devices, can be located within their corresponding server, or can be located at the same or at geographically disparate physical locations.

Network 630 can be a local area network (LAN) or a wide area network (WAN), but can also be other wired or wireless networks. Network 630 may be the Internet or some other public or private network. Client computing devices 605 can be connected to network 630 through a network interface, such as by wired or wireless communication. While the connections between server 610 and servers 620 are shown as separate connections, these connections can be any kind of local, wide area, wired, or wireless network, including network 630 or a separate public or private network.

Figure 7:
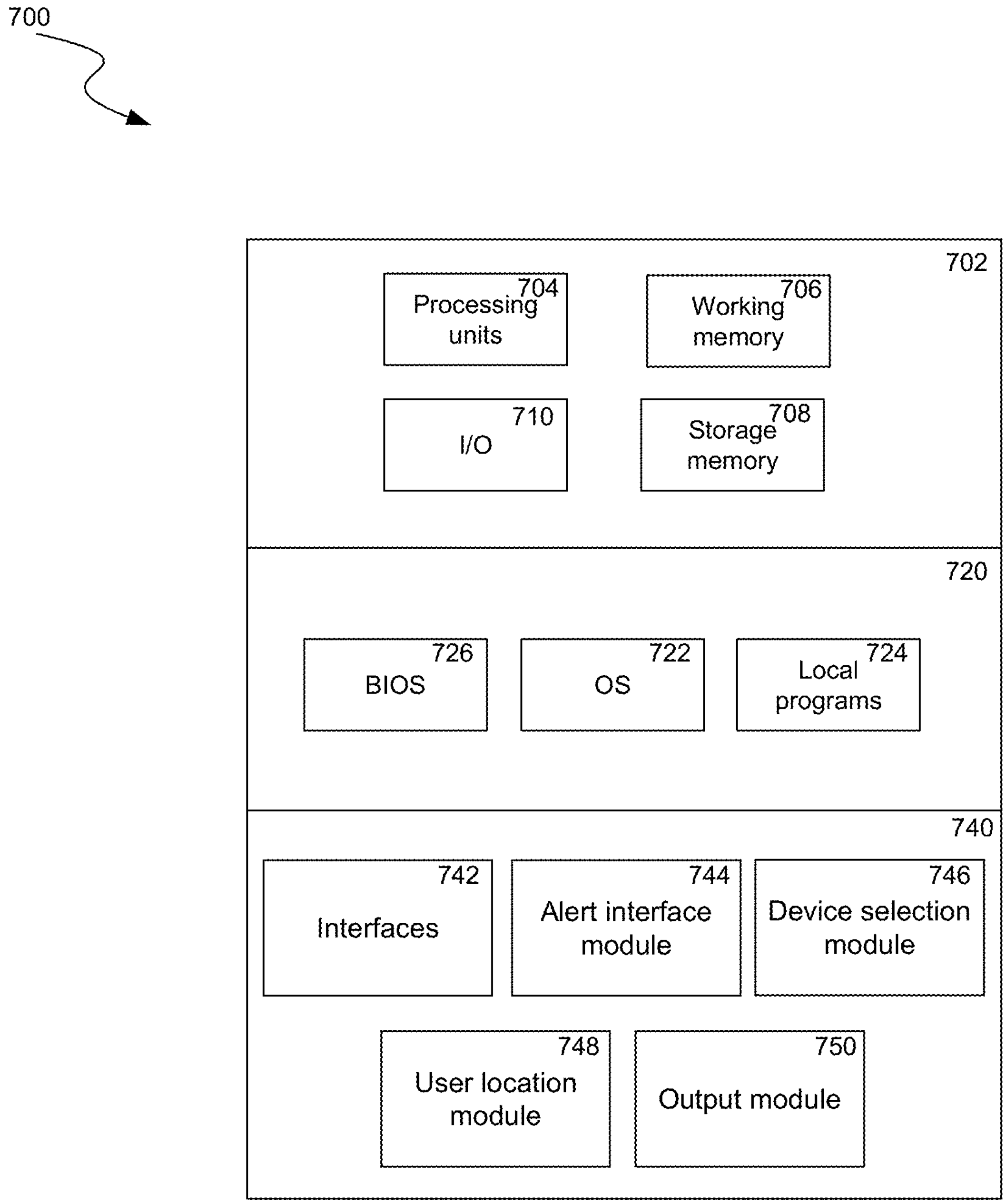
FIG. 7 is a block diagram illustrating components which in some implementations can be used in a system employing the disclosed technology.

FIG. 7 is a block diagram illustrating components 700 which, in some implementations, can be used in a system employing the disclosed technology. The components 700 include hardware 702, general software 720, and specialized components 740. As discussed above, a system implementing the disclosed technology can use various hardware including processing units 704 (e.g. CPUs, GPUs, APUs, etc.), working memory 706, storage memory 708 (local storage or as an interface to remote storage, such as storage 615 or 625), and input and output devices 710. In various implementations, storage memory 708 can be one or more of: local devices, interfaces to remote storage devices, or combinations thereof. For example, storage memory 708 can be a set of one or more hard drives (e.g. a redundant array of independent disks (RAID)) accessible through a system bus or can be a cloud storage provider or other network storage accessible via one or more communications networks (e.g. a network accessible storage (NAS) device, such as storage 615 or storage provided through another server 620). Components 700 can be implemented in a client computing device such as client computing devices 605 or on a server computing device, such as server computing device 610 or 620.

General software 720 can include various applications including an operating system 722, local programs 724, and a basic input output system (BIOS) 726. Specialized components 740 can be subcomponents of a general software application 720, such as local programs 724. Specialized components 740 can include alert interface module 744, device selection module 746, user location module 748, output module 750, and components which can be used for providing user interfaces, transferring data, and controlling the specialized components, such as interfaces 742. In some implementations, components 700 can be in a computing system that is distributed across multiple computing devices or can be an interface to a server-based application executing one or more of specialized components 740. Although depicted as separate components, specialized components 740 may be logical or other nonphysical differentiations of functions and/or may be submodules or code-blocks of one or more applications.

In some embodiments, the alert interface module 744 is configured to connect to devices and generate. interactive messaging between the connected devices for displaying or transmitting alerts. The alert interface module 744 can identify the user interface capabilities of the devices and determine whether the device has a display to output a visual message, a speaker to output an audible notification, lights to output a visual notification (e.g., flashing light), or a vibration capability. The alert interface module 744 can query the devices to determine the output capabilities of the devices.

In some embodiments, the device selection module 746 is configured to select a device(s) at the location of the user to output the alert to the user. Device selection module 746 can select devices within a threshold distance of the user's location. In some implementations, device selection module 746 selects a single device of a group of devices to output the alert, when the group of devices are within a threshold distance of each other. In some implementations, device selection module 746 selects the device to output the alert to the user based on the subject matter of the event.

In some embodiments, the user location module 748 is configured to determine the location of the user within a structure (e.g., building, house, apartment, condo, etc.). User location module 748 can determine the location of the user with motion detection sensors to identify where in the structure the user is currently located. In some implementations, user location module 748 determines the user location based on a location of a user wearable device, biometric sensors (e.g., facial recognition, body recognition, etc.), cameras (e.g., infrared, heat detection, etc.), or microphones.

In some embodiments, the output module 750 is configured to output alerts from a selected device(s). The output module 750 can output the alert for a predetermined amount of time or until the user acknowledges the alert, such as a button command or a voice command. The output module 750 can output the alert on all the devices connected to the alert interface or on selected devices. The output module 750 outputs the alert account to the user interface capabilities, such as visual, audible, and/or vibration, of the device.

Those skilled in the art will appreciate that the components illustrated in FIGS. 5-7 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g. "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

Unless explicitly excluded, the use of the singular to describe a component, structure, or operation does not exclude the use of plural such components, structures, or operations. As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

As used herein, the expression "at least one of A, B, and C" is intended to cover all permutations of A, B and C. For example, that expression covers the presentation of at least one A, the presentation of at least one B, the presentation of at least one C, the presentation of at least one A and at least one B, the presentation of at least one A and at least one C, the presentation of at least one B and at least one C, and the presentation of at least one A and at least one B and at least one C.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

I claim:

1. A method comprising:

performing, by a user device, data scraping of one or more websites or databases;

identifying, based on the data scraping, an event that is within a proximity of a geographic location of the user device;

selecting, based on a subject matter of the event, a first device and a second device to output an alert, wherein the first device and the second device are communicatively connected to the user device via an alert interface and have a capability to output at least a first alert type and a second alert type corresponding to the subject matter of the event; and sending an instruction that requests the alert to be output from the first device and the second device using the first alert type or the second alert type to notify at least one user of the event.

2. The method of claim 1, further comprising:

determining a visual, audio, and vibration capability of the first device and the second device; and determining the first device and the second device have the capability to output the first alert type and the second alert type based on the visual, audio, and vibration capability.

3. The method of claim 1, further comprising:

determining a first location of the at least one user is above a threshold distance from a second location of at least one of the first device or the second device, wherein sending the instruction that requests the alert to be output from the first device and the second device comprises causing the alert to be output using the first alert type at a pre-determined volume based on the first location of the at least one user being above the threshold distance from the second location of at least one of the first device or the second device.

4. The method of claim 1, further comprising:
querying devices within a structure associated with the at least one user to collect information about the devices; and
identifying a notification capability of each of the devices based on the information.

5. The method of claim 1, further comprising:
determining whether the at least one user has a history of responding to alerts indicating the event.

6. The method of claim 1, further comprising:
receiving a selection by the at least one user for the first device and the second device to output alerts for the event with the subject matter.

7. The method of claim 1, wherein the first alert type includes one or more audible or visual patterns that indicate the subject matter of the event.

8. A system comprising:
one or more processors; and
one or more memories storing instructions that, when executed by the one or more processors, cause the system to perform a process comprising:
performing, by a user device, data scraping of one or more websites or databases;
identifying, based on the data scraping, an event that is within a proximity of a geographic location of the user device;
selecting, based on a subject matter of the event, a first device and a second device to output an alert, wherein the first device and the second device are communicatively connected to the user device via an alert interface and have a capability to output at least a first alert type and a second alert type corresponding to the subject matter of the event; and
sending an instruction that requests the alert to be output from the first device and the second device using the first alert type or the second alert type to notify at least one user of the event.

9. The system of claim 8, wherein the process further comprises:
determining a visual, audio, and vibration capability of the first device and the second device; and
determining the first device and the second device have the capability to output the first alert type and the second alert type based on the visual, audio, and vibration capability.

10. The system of claim 8, wherein the process further comprises:
determining a first location of the at least one user is above a threshold distance from a second location of at least one of the first device or the second device, wherein sending the instruction that requests the alert to be output from the first device and the second device comprises causing the alert to be output using the first alert type at a pre-determined volume based on the first location of the at least one user being above the threshold distance from the second location of at least one of the first device or the second device.

11. The system of claim 8, wherein the process further comprises:
querying devices within a structure associated with the at least one user to collect information about the devices; and
identifying a notification capability of each of the devices based on the information.

12. The system of claim 8, wherein the process further comprises:
determining whether the at least one user has a history of responding to alerts indicating the event.

13. The system of claim 8, wherein the process further comprises:
receiving a selection by the at least one user for the first device and the second device to output alerts for the event with the subject matter.

14. The system of claim 8, wherein the first alert type includes one or more audible or visual patterns that indicate the subject matter of the event.

15. A non-transitory computer-readable medium storing instructions that, when executed by a computing system, cause the computing system to perform operations comprising:
performing, by a user device, data scraping of one or more websites or databases;
identifying, based on the data scraping, an event that is within a proximity of a geographic-device location of the user device;
selecting, based on a subject matter of the event, a first device and a second device to output an alert, wherein the first device and the second device are communicatively connected to the user device via an alert interface and have a capability to output at least a first alert type and a second alert type corresponding to the subject matter of the event; and
sending an instruction that requests the alert to be output from the first device and the second device using the first alert type or the second alert type to notify at least one user of the event.

16. The non-transitory computer-readable medium of claim 15, wherein the operations further comprise:
determining a visual, audio, and vibration capability of the first device and the second device; and
determining the first device and the second device have the capability to output the first alert type and the second alert type based on the visual, audio, and vibration capability.

17. The non-transitory computer-readable medium of claim 15, wherein the operations further comprise:
determining a first location of the at least one user is above a threshold distance from a second location of at least one of the first device or the second device, wherein sending the instruction that requests the alert to be output from the first device and the second device comprises causing the alert to be output using the first alert type at a pre-determined volume based on the first location of the at least one user being above the threshold distance from the second location of at least one of the first device or the second device.

18. The non-transitory computer-readable medium of claim 15, wherein the operations further comprise:
querying devices within a structure associated with the at least one user to collect information about the devices; and
identifying a notification capability of each of the devices based on the information.

19. The non-transitory computer-readable medium of claim 15, wherein the operations further comprise:
determining whether the at least one user has a history of responding to alerts indicating the event.

20. The non-transitory computer-readable medium of claim 15, wherein the operations further comprise:
receiving a selection by the at least one user for the first device and the second device to output alerts for the event with the subject matter.

* * * * *